(12) United States Patent
Hamar et al.

(10) Patent No.: US 7,918,579 B2
(45) Date of Patent: Apr. 5, 2011

(54) LIGHTED FLOORING

(76) Inventors: Douglas J. Hamar, Hancock, MI (US); Jerry Milatz, Traverse City, MI (US)

( * ) Notice: Subject to any disclaimer, the term of this patent is extended or adjusted under 35 U.S.C. 154(b) by 20 days.

(21) Appl. No.: 11/801,390

(22) Filed: May 9, 2007

(65) Prior Publication Data

US 2007/0263380 A1 Nov. 15, 2007

Related U.S. Application Data

(60) Provisional application No. 60/798,853, filed on May 9, 2006.

(51) Int. Cl.
*F21S 8/00* (2006.01)

(52) U.S. Cl. ...................... 362/153; 362/153.1; 362/145; 362/552; 362/555; 362/146

(58) Field of Classification Search .................. 362/153, 362/153.1, 145, 146, 552, 555
See application file for complete search history.

(56) References Cited

U.S. PATENT DOCUMENTS

| | | | | |
|---|---|---|---|---|
| 2,936,387 | A * | 5/1960 | Steele et al. ...................... 313/22 |
| 3,902,056 | A * | 8/1975 | Aizenberg et al. ............ 359/597 |
| 4,340,929 | A * | 7/1982 | Konikoff et al. ............... 362/153 |
| 4,737,764 | A * | 4/1988 | Harrison ......................... 362/153 |
| 5,095,412 | A * | 3/1992 | French ........................... 362/153 |
| 5,117,221 | A | 5/1992 | Mishica, Jr. |
| 5,136,479 | A * | 8/1992 | Ruffner ........................... 362/29 |
| 5,391,960 | A * | 2/1995 | Moribayashi et al. ......... 313/594 |
| 6,231,206 | B1 * | 5/2001 | Hervey et al. .................. 362/153 |
| 6,417,778 | B2 | 7/2002 | Blum et al. |
| 6,565,239 | B2 * | 5/2003 | Rizkin et al. ................... 362/373 |
| 6,672,749 | B2 | 1/2004 | Nicholls et al. |
| 6,910,786 | B1 * | 6/2005 | Seland ............................ 362/364 |
| 6,950,599 | B2 | 9/2005 | Nicholls et al. |
| 6,982,649 | B2 * | 1/2006 | Blum et al. ................... 340/815.4 |
| 7,125,137 | B2 * | 10/2006 | Kitajima et al. ............... 362/153 |
| 2004/0213020 | A1 | 10/2004 | Gotfried |
| 2005/0057945 | A1 | 3/2005 | Pipo et al. |
| 2007/0159814 | A1 * | 7/2007 | Jacobsson ...................... 362/153 |
| 2008/0005981 | A1 * | 1/2008 | Jacobsson ....................... 52/202 |

* cited by examiner

*Primary Examiner* — Stephen F Husar
*Assistant Examiner* — James W Cranson
(74) *Attorney, Agent, or Firm* — Richard W. Hoffman; Reising Ethington PC

(57) ABSTRACT

A floor assembly including a top having at least one transparent or translucent light emitting portion for emitting light is provided. At least one light source is provided for supplying light. The light source is optically connected to the light emitting portion. The assembly may include a light guide for guiding light therethrough. Also, a light refracting portion may be included for directing light emanating from the light source.

18 Claims, 3 Drawing Sheets

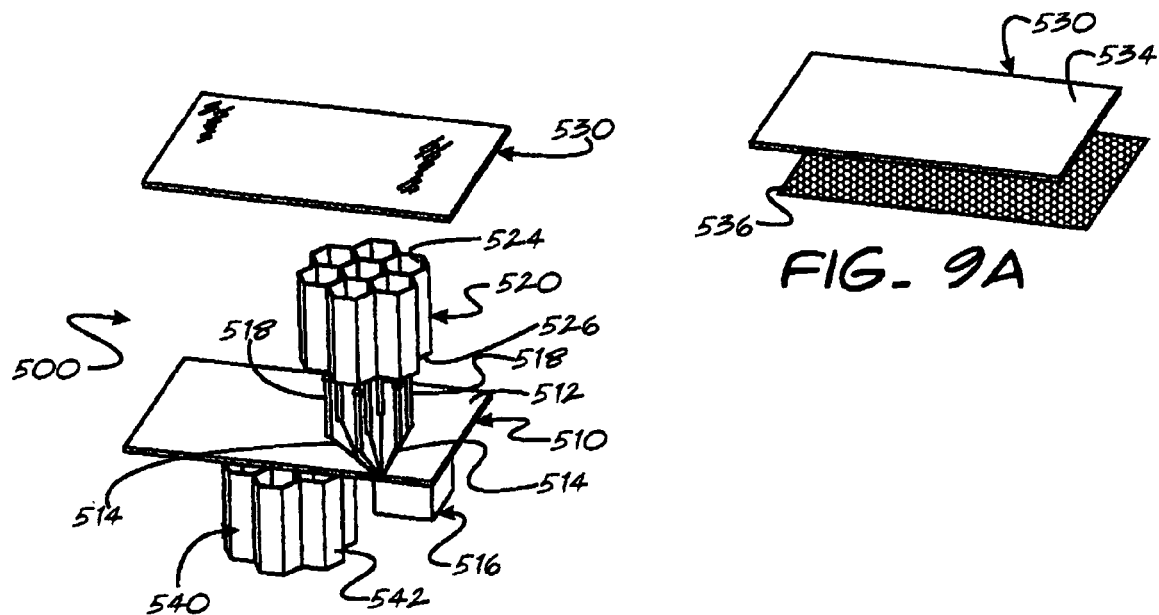
FIG. 9A
FIG. 9
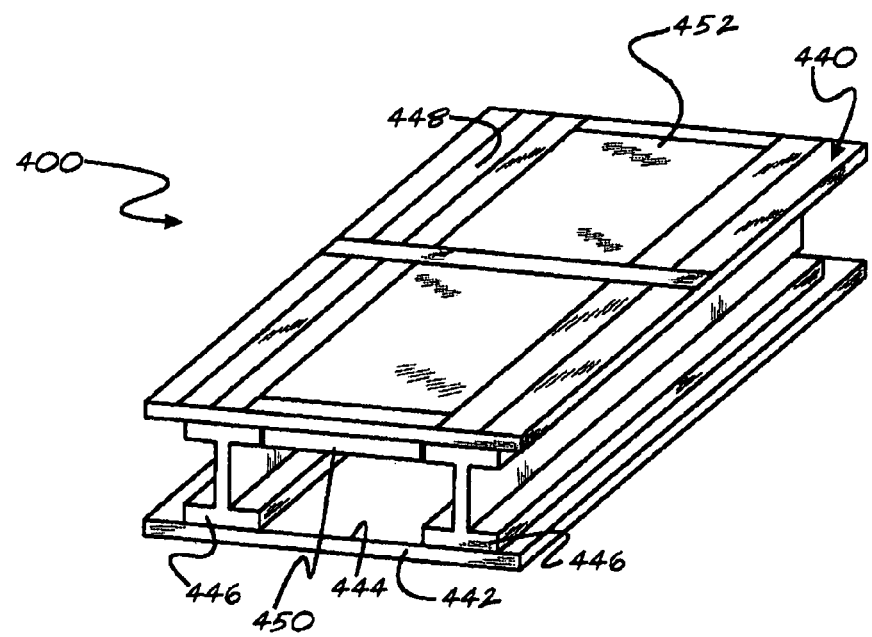
FIG. 8

LIGHTED FLOORING

CROSS-REFERENCE TO RELATED APPLICATION

This application claims priority to and benefit of U.S. Provisional Patent Application Ser. No. 60/798,853 filed May 9, 2006, the entire specification of which is expressly incorporated herein by reference.

FIELD OF THE INVENTION

The present invention relates to a light assembly for emitting light through a floor.

BACKGROUND OF THE INVENTION

Floors or other surfaces can have a variety of designs placed on them depending upon the material used to form the floor or surface. For example, wood floors can have polished finishes, stained finishes, or painted finishes to depict certain designs. One example of this is basketball courts in which lines are painted onto the wood floor in order to mark the boundaries of the court and depict other designs, logos or advertisements. However, all of these finishes or images are semi-permanent, in that it is time consuming to remove or replace the images on the floor. In order to replace the design on the floor, the floor must be sanded to remove the finish material and refinished. In some instances, such as those associated with a portable floor application, the floor typically may need to be removed and transported to another facility in order to re-finish the floor. This process of removing the image and replacing it with a new one is a time consuming and costly process.

Some floors are portable and are designed to be able to be removed and reinstalled such as a wood floor for basketball courts in sports arenas. The wood floors are placed on a substrate, such as a concrete floor. The wood floor can be used for events such as basketball games. The floor can be removed for other arena events, such as concerts. Portable floor assemblies are typically made in a series of floor panels. Typically, the floor panels are typically 4 feet wide by 8 feet long or 4 feet wide by 4 feet long. Each panel includes a subfloor having a plurality of tongue and groove strips secured thereto. Standard strips are typically 2¼ inches wide or 1½ inches wide by a predetermined length. The strips are connected to each other to form the floor panel by any suitable fastener. An example of a connection of the strips is, but not limited to, a tongue and groove assembly. Thus, the strip has a flange or tongue on one end and a groove on the opposite edge. When the strips are placed next to each other, the tongue is received by a groove of an adjacent strip; thus, mechanically locking the strips together to form the panels. Additionally, a nail or staple can be inserted into the strips, such that the nail extends through the tongue of one strip. A series of stringers or sleepers underlies the subfloor panels and spaces the subfloor from the substrate. Often resilient pads are placed between the stringers or sleepers and the substrate. These pads help give the floor proper performance characteristics. The panels are held together by suitable connection hardware. One such example of a portable floor is disclosed in U.S. Pat. No. 6,173,548 B1.

Currently, lights are used in a variety of ways to illuminate all or part of the floor. For example, lights are used to accent a design feature such as a logo painted onto the floor. Additionally, spotlights may be used that display a pattern when shown onto the floor surface. Each of these types of lights illuminates the floor from a point above the surface. That is, lights are typically used to accent the floor or to shine a design on the floor by being directed at the floor.

It is desirable to develop an assembly in which lights can be incorporated into the floor in order to provide an image in the floor, or provide accent lights to the floor. This would allow for a more economical means for replacing the image depicted on the floor. Further, it is desirable to develop an assembly where lights are embedded in the floor surface to accent the designs of the surface.

SUMMARY OF THE INVENTION

According to one embodiment of the present invention there is provided a floor assembly comprising a top forming at least a portion of a floor. The top has at least one light emitting portion for emitting light therethrough. The assembly further comprises at least one light source disposed below the top and coupled with said at least one light emitting portion.

According to another embodiment of the present invention, there is provided a floor assembly comprising a floor surface and having at least one light emitting portion for emitting light therethrough. The light emitting portion comprises a light refracting portion for guiding light passing therethrough. The assembly further includes at least one light source disposed below the light refracting portion for providing light to the light refracting portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a perspective view of another embodiment of the present invention;

FIG. 9 is an exploded view of another embodiment of the present invention; and FIG. 9A is an exploded, perspective view of an alternate top.

DETAILED DESCRIPTION OF THE PREFERRED EMBODIMENTS

The following description of the preferred embodiment(s) is merely exemplary in nature and is in no way intended to limit the invention, its application, or uses.

Figure 1:
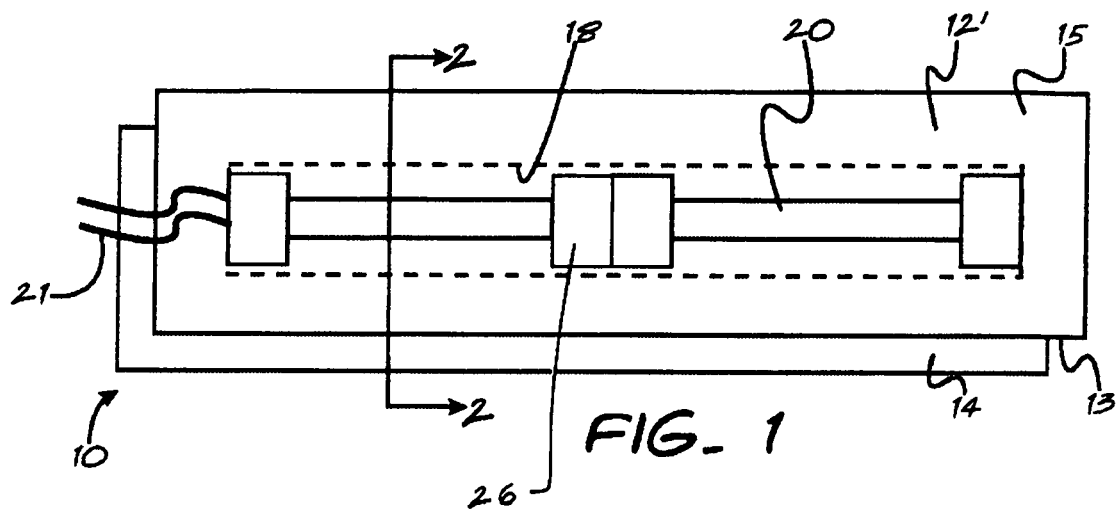
FIG. 1 is a plan view of one embodiment of the present invention where a light source is embedded in a strip.
Figure 2:
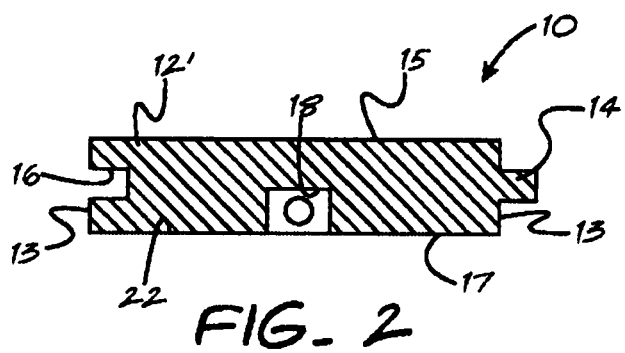
FIG. 2 is a cross sectional view across the line 2-2 in FIG. 1.
Figure 1B:
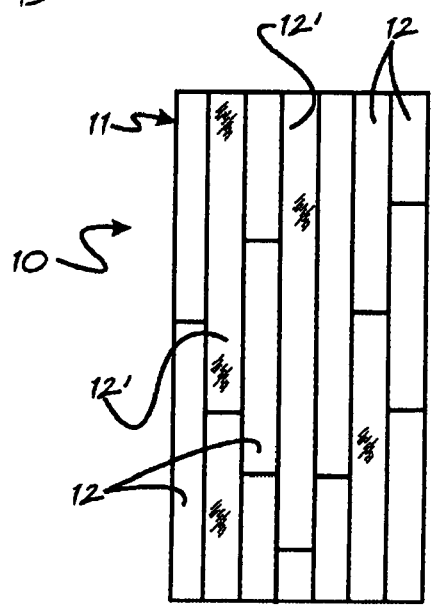
FIG. 1B is a top view of a floor assembly.

Referring to FIGS. 1 and 2, a floor assembly is generally shown at 10. As shown in FIG. 1b, in a preferred embodiment, the floor assembly 10 has a floor covering comprising plurality of strips generally indicated at 12 that form a panel 11. Each strip 12 preferably is a conventional tongue and groove strip 12 having a tongue that extends longitudinally on at least one side and a groove that extends longitudinally on at least the opposite side from the tongue. It will be appreciated the while tongue and groove flooring is described, the flooring used herein can comprise any floor covering, such as for example but not limited to melamine or synthetic floors which are well known.

Typically, the strips 12 are made of wood in any well-known manner, which are then assembled to form a larger wood panel or floor. In one preferred embodiment of the present invention, at least one of the strips 12 which are used to form the panel are made of a transparent or translucent material. By way of example only, a single transparent strip 12' is shown in FIGS. 1 and 2. A shown, the strip 12' has a plurality of sidewalls 13, a top 15 and a bottom 17. The strip 12' includes tongue 14 and groove 16 of a conventional configuration. A cavity 18 is defined between the plurality of sidewalls 13 and top 15. The cavity 18 extends longitudinally within strip 12'. Thus, the cavity 18 extends substantially parallel to the tongue 14 and groove 16 which are located on the sidewalls.

A light source 20 extends within the cavity 18 in order to emit light through the transparent top 15 of the strip 12'. The light source 20 is preferably fully disposed within the cavity 18 and below the top 15. However, it will be appreciated that the light source 20 may only be partially disposed within the cavity 18.

A reflection plate 22 may extend along the bottom of the strip 12'. The reflection plate 22 can comprise any suitable reflecting surface. For example, the reflection plate 22 may comprise a reflective metal. The reflective plate 22 reflects the light from the light source 20 in a desired direction. In this manner, light that could otherwise be directed downwardly out of the bottom 17 of the strip 12' will be reflected upwardly through the transparent or translucent top. This will result in a more intense light passing through the top 15, thus increasing the brightness.

The light source 20 can comprise any suitable light source that is suitable to emit light through the top surface. Examples of a suitable light source 20 include, but are not limited to, a "super bright" light emitting diode (LED) or a cold cathode tube. Most preferably, a cold cathode tube is used as the light source 20. Such tubes are sufficiently bright to emit enough light and produce a relatively low amount of heat. It is preferred that the amount of heat that is generated be relatively low. This is a consideration because the strips 12' are used in conjunction and adjacent to wood strips 12. Further, the light source 20 must emit a sufficient amount of light in order to adequately illuminate so that the lighting source 20 can be seen when other bright or high intensity ambient or artificial light is being emitted around the strip 12.

By way of non-limiting example, one suitable light source 20 may comprise a cold cathode tube manufactured by Ultra. In this example, the cathode tube is powered by a 12 volt power source (not shown) through electrical connections 21. In this example, a pair of cathodes produces 7 watts.

Suitable cold cathode tubes may come in a variety of colors, having various sizes and power sources. Typically, each cathode is electrically connected to a ballast 26. Depending upon the ballasts 26 that are used, the ballasts 26 can be placed in series if the ballasts 26 have a male female end for electrically connecting the ballasts 26.

Any suitable transparent or translucent material can be used to make a strip 12'. In one example, the transparent strip 12' is made of nylon. The nylon resin material can be cast into the desired shape of the strip 12' incorporating the cavity 18. Alternatively, the nylon resin can be extruded to form the strip 12. The material used to make the transparent strip 12 preferably comprises a material that can be sanded and finished so that any imperfections on the surface of the transparent strip 12 can be corrected in order for the light to continue to be emitted through the strip 12. More specifically, the strips 12' are incorporated into a floor adjacent wood strips 12. The floor periodically may need to be refinished. This is accomplished by sanding the floor and thereafter putting a finish on the floor. Accordingly, the strips 12' will have to be sanded simultaneously with the adjacent wood strips 12. If the strips 12' were not sanded, they would extend to a height different from those of the sanded wood strips 12 creating an uneven surface. Once the strips 12' are sanded, the finishing material preferably will fill in any sanding marks on the top thereof. In this manner, the top of the strip 12' will allow sufficient light to pass there through. It will be appreciated that even if the finish does not completely fill the sanding marks, sufficient light will still pass through the top of the strip 12'. Again, it will be appreciated that any suitable material can be used, so long as the material has adequate characteristics to support the weight and/or forces applied to the surface. With a floor made in this manner, a top surface is provided that includes at least one light emitting portion, the top of the strips 12', for emitting light therethrough.

Further, multiple light sources 20 may be placed in the cavity 18. Preferably, the multiple light sources, such as cathode tubes are arranged so that they extend substantially parallel to one another. The multiple sources may be of the same or different colors. Thus, similar or different colors of the light sources 20 can be placed next to each other within a single cavity 18 in the same strip 12'. Each light source can be selectively energized so that different sources can be illuminated or energized at desired times. This may allow either different colors to be illuminated or if the tubes are the same color, for a higher intensity light.

Further, multiple transparent strips 12 can be placed adjacent to one another to further enhance lighting capabilities. The strips 12' can be placed in any location on the floor. Further, the strip 12' can have any length. Thus, it is possible to make myriad of patterns using the strips 12' at selected locations. The lights can also be selectively illuminated to provide an accent to the floor. Further, the strips 12' are intended to be placed either under the playing surface of the floor itself or around the periphery of the playing surface. Energization and intensity of the lights may be accomplished by a suitable controller.

In this embodiment, then, the top 15 comprises a portion of the floor surface. The top 15 is transparent or translucent and therefore constitutes a light emitting portion for emitting light from the light source 20 therethrough. The light source 20 is coupled with the light emitting portion. In this embodiment, light can travel directly from the light source 20 out of the top 15.

Figure 3:
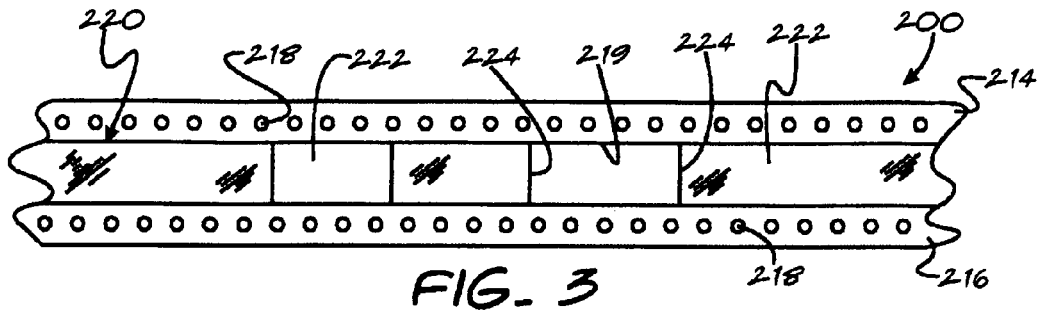
FIG. 3 is a side cross-sectional view of another embodiment of the present invention.
Figure 4:
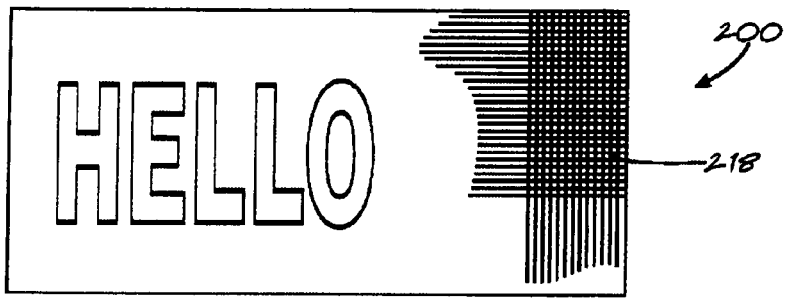
FIG. 4 is a top plan view of the embodiment of shown in FIG. 3.

Referring to FIGS. 3 and 4, another embodiment of the floor assembly is generally shown at 200. The floor assembly 200 may comprise a section of a permanent floor or a panel of a portable floor as described above. Alternatively, it may comprise a portion of such a panel. In this embodiment, the floor assembly 200 comprises at least three components. A top or first layer 214 comprises a transparent or translucent material. The top 214 forms at least a portion of the floor surface. However, it is not necessary that the bottom 216 necessarily be transparent or translucent. Likewise, a bottom 216 comprises a transparent or translucent material. The top 214 and the bottom 216 each contain a grid of conductive material 218 in order to carry an electrical charge throughout the desired portions of the top 214 and the bottom 216. For example, the conductive material 218 in the top 214 can be connected to ground and the conductive material in the bottom 216 can be arranged to carry a positive charge. In this manner, an electrical field can be created between the conductive material in the top 214 and bottom 216.

The conductive material 218 can comprise any material capable of conducting electricity. It is preferred that the conductive material 218 be sized so as to not inordinately interfere with the passage of light through the top surface of the top layer 214. One such material that can be used is a fine metal mesh or screen. Also, various portions of the conductive material may be electrically isolated from other portions of the conductive material. In this manner, various portions of the conductive material may be selectively activated to illuminate various portions to illuminate various designs, as set forth below.

A cavity 219 is defined between the top 214 and bottom 216. An intermediate layer, generally indicated at 220, includes panels 222 placed between the top 214 and the bottom 216. The panels 222, disposed between the top 214 and the bottom 216, define chambers 224, 224' in the intermediate layer 220. The chambers 224, 224' are arranged in a predetermined shape dependent upon the shape and placement of the panels 222. Some of the chambers 224 may be filled with air. Other chambers 224' are filled with a gas that will illuminate when exposed to an electrical field, such as by way of non-limiting example, neon or argon gas. Preferably, the panels 222 are made of a non-conductive material and can be placed between the chambers 224, 224'. This will isolate the chambers 224' filled with gas from the chambers 224 filled with air. In this manner, the chambers 224, 224' can be configured to form various shapes that can be illuminated.

In a preferred embodiment, the light source comprises gas that will illuminate, such as neon or argon, contained in the chambers 224'. The grid of conductive material 218 energizes the gas to illuminate it. Thus, at least some of the voids 224' are filled with a gas that illuminates in response to an electric field. As the gas in the chambers 224' is illuminated, the shape of the chambers 224' is illuminated to display the design of the voids 224 (FIG. 4) through the transparent or translucent top 214. The light source is, therefore, coupled with the light emitting top 214. That is, light can travel directly from the light source out of the top 214.

As shown, the chambers 224' are isolated form one another by non-conductive panels 222. It will be appreciated, however, that the intermediate layer 220 may comprise one large chamber 224' filled with a gas that will illuminate when excited. In this manner, selective energization of portions of the conductive material 218 can be utilized to illuminate only portions of the gas, thereby creating an illuminated pattern. That is, as set forth above, portions of conductive material 218 can be isolated from other portions of the conductive material 218. By selectively energizing portions of the conductive material 218, an image or pattern can be displayed through the top 214. Selective energization of the conductive material 218 can be accomplished by the use of a suitable controller (not shown)

Additional layers can be stacked above the top 214. For example, another layer having chambers 224, 224' can be placed on the top 214. Then an additional transparent or translucent top having conductive material therein can be placed thereon. The gasses in the chambers 224' of the multiple layers can contain different gasses which will illuminate different colors. Because the two layers share a common ground (in conductive material 218 in the original top 214), the electrical field can be selectively generated by applying electricity to either the conductive material 218 in the bottom 216 or the conductive material in the added top layer of this embodiment (not shown) or both. In this way, one or more of the layers of the same or differing gasses can illuminate to create various colors in the display. It will be appreciated that any number of such layers may be stacked together.

Figure 5:
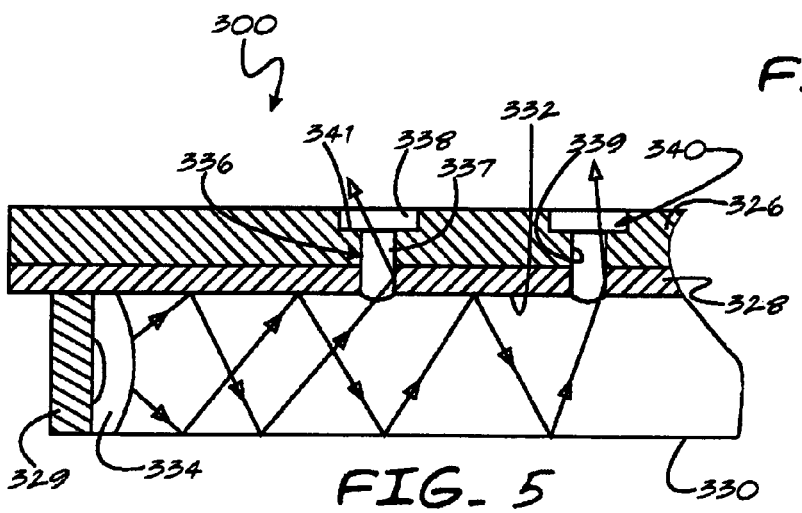
FIG. 5 is a cross-sectional view of another embodiment of the present invention.

Referring to FIG. 5, another embodiment of the floor assembly is generally shown at 300. The floor assembly 300 has a floor layer or top 326 that forms at least a portion of the floor surface and a sub-floor or second layer 328. The floor layer or top 326 preferably comprises tongue and groove strip flooring of the type described above. It will be appreciated, however, that any type of floor covering material may be used as the floor layer 326. The subfloor 328 is a panel to which the flooring material is attached in a well-known manner. The subfloor can comprise any suitable material, such as, for example, oriented stand board or plywood. Typically, the subfloor 328 is carried on a substrate (not shown) by a plurality of sleepers 329 (only one shown) in a well-known manner. The sleepers 329 extend between the substrate and subfloor 328, and space the subfloor 328 a distance from the substrate. Thus, a space or cavity 332 is created between the substrate and the subfloor 328.

In one embodiment, a reflective layer 330 is disposed below the subfloor 328 and preferably adjacent the substrate. It is preferred that at least the upper face of this reflective layer 330 (when present) comprises a reflective surface, such as a metal surface, in order to reflect light from a light source 334. Further, the bottom surface of the subfloor may also include a reflective surface thereon for reflecting light from the light source 334. It will be appreciated that the reflective surface is not necessary, but can be used to optimize the light transmittance.

In one embodiment, the light source 334 is a Xenon strobe light. This type of light emits an adequate amount of light in order to propagate through the cavity 332 and be emitted from the top 300 with sufficient brightness. It will be appreciated, however, that any suitable light source 334 can be used within the scope of the present invention. For example, the light source may comprise one or more LEDs or cold cathode tubes, as described in connection with alternate embodiments above.

Figure 6:
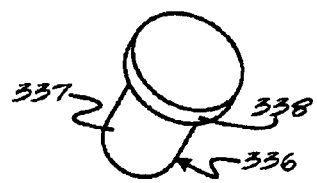
FIG. 6 is a perspective view of a light guide in accordance with an embodiment of the present invention.

At least one light guide assembly, generally indicated at 336, extends through the top surface of the floor layer 326 through the subfloor layer 328 and into the cavity 332. In reference to FIGS. 5 and 6, the light guide assembly 336 preferably includes a light guide portion 337 and a flange portion 338 at the top of the light guide portion 337. The flange portion 338 is preferably, but not necessarily, circular in cross section and has a diameter that is greater than the diameter of the light guide portion 337.

To accommodate the light guide assembly 336, the floor assembly 300 has an opening 339 extending therethrough. The opening 339 extends through the floor layer 326 and the subfloor 328 to the cavity 332. A larger diameter cavity 340 extends about the opening 339 from the top surface of the floor layer 326, for accommodating the flange portion 338. The large diameter cavity 340 preferably does not extend all the way through the floor layer 326. Rather, the cavity 340 provides an annular recessed ledge 341 on which the flange portion 338 can be supported.

To insert the light guide assembly 336, the light guide portion 337 is placed into the opening 339 and is inserted until the peripheral edges of the flange portion 338 seats on the ledge 341. An adhesive can be placed on the peripheral edges of the flange portion 338 (outward of the light guide portion 337) to secure the light guide assembly 336 to the first floor layer 326 without obstructing the light reflection characteristics of the light guide portion 337.

That is, the transmittance properties of some light guide portions 337 may be affected by the presence of adhesive on the light guide portion 337. By utilizing the larger flange portion 338 and securing only the periphery of the flange portion 338 that extends outwardly from the light guide section 337, the performance of the light guide portion 337 will be unaffected by any securing medium, such as adhesive.

The flange portion 338 is preferably made of a transparent or translucent material. The top surface of the flange portion 338 of the light guide assembly 336 is preferably made of a material which can be sanded and finished so that when other portions of the first layer 326 are refinished (as described above), the upper surface of the flange portion 338 is treated in the same manner.

In this embodiment, the top 326 forms at least a portion of the floor surface. The flange portion 338 comprises a light emitting portion for emitting light through the top 326. The light source is coupled with the flange portion and receives light directly from the light source 334 or light that is directed therethrough by the light guide portion 337.

Figure 7:
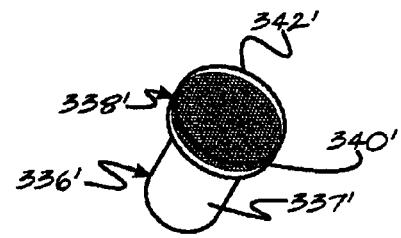
FIG. 7 is a perspective views of an alternate embodiment of a light guide assembly in accordance with another embodiment of the present invention.

In reference to FIG. 7, there is shown an alternate embodiment of the light guide assembly 336'. In this embodiment, the flange portion comprises a light refracting element generally indicated at 338'. The light refracting element 338' refracts or reflects the light so that at least some of the light transmits at an angle related closer to the plane of the top 326 than if the flange portion did not comprise a light refracting element 338'. Thus, the light emitted from the light guide assembly 336' can be directed at many angles which enhance the appearance of the floor assembly 300. Further, in this embodiment, at least the interior of the light guide portion 337' preferably comprises a polished metal, and most preferably polished aluminum, to propagate the light through the light guide assembly 336'. It will be appreciated, however, that any suitable light guide may be used.

The light guide assembly 336' is inserted into the opening 339, 340 as set forth above. The bottom of the light refracting element 338' is placed on the ledge 341 and secured in place with a suitable adhesive. However, in this embodiment, adhesive may also be placed on the exterior of the light guide portion 337'. Since the light guide portion 337' comprises a reflective metal material adhesive on the exterior surface will not interfere with its performance. That is, the adhesive will not degrade the transmittance of light through the light guide portion 337'. Since, in this embodiment, an adhesive may be used to secure the light guide 336' in the opening 339, it is not necessary to include a larger flange portion on the light refracting element 338'. That is, the light refracting element 338' may have the same or a different diameter as the light guide portion 337'. In this case, a larger diameter cavity 340 may not be necessary.

The light refracting element 338' preferably comprises two portions. First, a light refracting portion 340' is disposed at the bottom thereof adjacent the light guide portion 337'. A protective flat portion 342' may be placed over the light refracting portion 340' so that the protective flat portion 342' creates a level surface with the first layer 326. The protective flat portion 342' may be made of a material which can be refinished along with the remainder of the top 326 when necessary. That is, the protective flat portion 342' can be refinished as set forth above. It will be appreciated that the light refracting portion 340' may comprise any suitable structure that can guide the direction of light. By way of non-limiting example, the light refracting portion 340' may comprise a corner prism. Alternatively, the light refracting portion 340' may comprise mirrors or fiber optics. Thus while the terminology light refracting is used herein, it can refer to either refracting or reflecting light or both.

By guiding the light passing through the light refracting portion 340', it is possible for the floor to display images to different individuals viewing the image from different angles simultaneously. This may be particularly useful when the floor is placed in an arena and viewed from multiple angles. By controlling the light emanating from the light refracting portion 340' one can allow viewers from different angles to see the same or different images in proper orientations It will be appreciated that any number of light guide assemblies 336, 336' may be used within the scope of the present invention. Further, the light guide assemblies 336, 336' may be placed in any orientation to create a desired pattern on the floor. Additionally, any number of light sources 334 can be used to increase the intensity and color palette of the light propagating through the light guide assembly 336, 336' or provide even light distribution. Preferably, the light source 334 is arranged in an optimal orientation to maximize the light propagating through the light guide assembly 336, 336'.

Additionally, the light sources 334 may be of different colors so that different colors can emanate through the light guide assembly 336, 336'. One or more light sources 34 may be placed adjacent one another to either increase the light intensity or vary the color. It will also be appreciated that the light sources 334 may be isolated so that they can pass light only through preselected light guide assemblies 336, 336'. In this manner, one can selectively control which light guide assemblies 336 and 336' are illuminated and with what color. This provides a great deal of flexibility when illuminating to create designs or patterns with the light. Intensity and selective application of the lights can be controlled by a suitable controller. Such an arrangement is particularly useful when LEDs are used as the light source.

It will also be appreciated that in certain instances a light guide portion 337, 337' may not be necessary. In such a case, the light source may be disposed directly below the opening 339 or at least partially within the opening 339. In such an arrangement, it is desirable to include either a flange portion 338 or a light refracting element 338' above the light source. In this case, while the light source may be disposed at least partially within the opening 339, it will still be disposed below the portion of the top through which the light is emitted, namely the transparent or translucent flange portion 338 or light refracting element 338'.

Referring to FIG. 8, another embodiment of the floor assembly is generally shown at 400. The floor assembly 400 includes a top generally indicated at 440. The floor assembly 400 may include a bottom 442. A plurality of sleepers 446 is interposed between the top 440 and bottom 442 to define a cavity 444 between the top 440 and bottom 442. It will be appreciated that the bottom 442 may be removed and that the sleepers 446 contact the substrate (not shown). The sleepers 446 can be of any suitable material or design. As used in connection with this embodiment, the top 440 may comprise tongue and groove flooring strips attached to a subfloor in a conventional manner. The transparent portion 452 of the top 440 preferably comprises a material that can be sanded and finished as described above.

In one preferred embodiment, the top 440 includes transparent portion 446. Transparent portion 452 comprises a transparent or translucent area placed at predetermined locations within the top 440 for emitting light therethrough. The top 440 also has non-transparent sections 448. At least one light source 450 is placed under the transparent portion 446 of the top 440. The light source is contained in the cavity 444.

In a preferred embodiment, the light source 450 comprises an LCD monitor of a well-known type. A single LCD monitor can be used or multiple LCD displays can be used to depict the same image or can be placed adjacent to one another each carrying a portion of a larger image that when viewed together displays a single image. By utilizing LCD monitors, virtually any image can be displayed by the light source. Thus, an LCD display allows greater flexibility with the images displayed. The images can be changed frequently and to display virtually anything. Alternatively, the light source can comprise a plasma monitor or an LED monitor.

The material for the top 440, bottom 442 and sleepers 446 preferably have strength characteristics adequate enough to support the weight and force applied to the floor assembly 400. An example of the material used to form the transparent portion 446 of the top 440 includes, but is not limited to, Lexan, Plexiglass, or other suitable transparent material. The sleepers 446 may comprise any suitable material including, but not limited to, aluminum. An example of the bottom 442 includes, but is not limited to, an aluminum diamond plate. This bottom would be affixed to the aluminum sleepers so that the bottom 442 can be raised or lowered in small increments to match the height of the surrounding subfloor. The top 440, bottom 442, and sleepers 446 are connected to one another by any known suitable fasteners (not shown). Further, suitable fasteners are provided to make this LCD display an integral part of the entire floor assembly 440.

Referring to FIG. 9, another embodiment of the present invention is shown. A floor assembly is generally shown at 500. The floor assembly 500 includes a bottom, generally indicated at 510. The bottom 510 preferably comprises a circuit board 512. The circuit board 512 is a printed circuit board having a plurality of electrical contacts 514 thereon in any well-known manner. The electrical contacts 514 are connected to a controller, generally indicated at 516. One end of each of the electrical contacts is also coupled with an LED 518. Preferably, a plurality of LEDs are grouped adjacent one another and supported by the circuit board 512. Thus, each LED is electrically coupled with the controller 516. Each LED is also coupled with a power source.

The assembly 500 further includes a support structure generally indicated at 520. The support structure 520 is for disposition about the LED 518 so as to protect the LED 518. The support structure 520 also supports a top 524. Further, the support structure 510 is open at each end. In the most preferred embodiment, the support structure comprises a honeycomb support structure 522 having open top 524 and bottom 526 ends. The interior of the honeycomb support structure 522 is hollow and can receive one or more LEDs 518. In the most preferred embodiment, the honeycomb support structure 522 comprises a plurality of aluminum tubes secured together. Preferably, the aluminum tubes comprise a hexagonal shape which is connected for providing the honeycomb support structure 522. In the most preferred embodiment, the interior of the hollow tubes is polished in order to provide a reflective surface and provides a light guide portion for directing light.

The LEDs are preferably grouped together such that a red LED 518 is adjacent a green LED 518 which are also adjacent a blue LED 518. Thus, groupings of red, green and blue are made. The red, green and blue LEDs 518 can be selectively energized and their intensity controlled by controller 516. In this manner, illumination of the red, green and blue LEDs 518 can allow virtually any color to be displayed.

The assembly 500 further includes a top, generally indicated at 530. The top 530 is for disposition on the honeycomb support structure 522. In this manner, the honeycomb support structure 522 and LEDs 518 are sandwiched between the circuit board 512 and top 530. The support structure 522 creates a plurality of cavities between the top 530 and the bottom 510. The top surface 530 is preferably transparent or translucent to allow light to pass therethrough. In one embodiment, the top 530 comprises a transparent surface 532 that is supported on the honeycomb support structure 522. The transparent surface is coupled with the light source such that it allows the light from the LEDs 518 to be transmitted therethrough.

In another embodiment as shown in FIG. 9A, the top surface 530' may comprise a layer having an upper smooth portion 534 and a lower light refracting portion 536. By way of non-limiting example, the light refracting portion 536 may comprise a corner prism. Alternatively, the light refracting portion 536 may comprise mirrors or fiber optics. By utilizing a light refracting 536, the light being emitted from the LED 518 can be directed through the top surface 530'.

The uppermost surface of either top surface 530, 530' is preferably made of a material which can be sanded and polished. This is because the light assembly 500 may be used in connection with a wood floor. And, as the wood floor may need to be sanded or refinished (as described above), the top surface 530 can be treated in the same manner.

It will be appreciated that the assembly 500 may take any shape. For example, the circuit board 512 and top layer 530 may have the width consisted with the width of one or more tongue and groove floorboards. Alternatively, the width of the circuit board 512 and top layer 530 may comprise any suitable width that may be used in connection with flooring material. By way of non-limiting example, wood flooring for portable floors is often made in 4 ft×4 ft or 4 ft×8 ft panels which are then connected together. Accordingly, the size of the circuit board 512 and top surface 530 may be made in these sizes so they can be connected to a portable floor in the usual manner. It will be appreciated that the floor assembly 500 may be of any size.

As shown, the honeycomb support structure 522 comprises a plurality of hexagonal sided tubes connected together. Many of the adjacent hexagons share a common wall. It will be appreciated, however, that the shape of the support structure 520 can comprise any shape. For example, the structure can be cylindrical, pentagonal, octagonal, etc. Further, the cylinders of the support structure 520 may be separated so that they do not share a common wall. In this case, the LEDs might be spaced further than with the above identified arrangement. This may be more desirable when the floor assembly 500 is used simply as accent lighting not requiring significant color or intensity control.

The honeycomb support structure 522 is preferably secured to the printed circuit board 512. Any suitable adhesive may be used to secure the structure 522 to the circuit board 512. The adhesive is used to secure the structure 522 such that the structure 22 does not shift relative to the circuit board which could potentially damage the LEDs 518 and their electrical connection to the circuit board 512.

Also, the circuit board 512 may be further supported on a second support structure generally indicated at 540. The second support structure 540 can comprise any suitable structure. For example, the second support structure 540 may comprise another honeycomb support structure 542 of the type described above. Alternatively, the second support structure 540 could comprise a wooden subfloor. The second support structure 540 may also comprise a substrate, such as a concrete slab onto which the floor assembly 500 may be placed The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A floor assembly comprising:
   a top forming at least a portion of a floor surface and having at least one light emitting portion;
   at least one light source disposed below said light emitting portion and coupled with said at least one light emitting portion; and
   said light emitting portion comprising a light refracting portion, to direct light from the light source at multiple angles.

2. A floor assembly as set forth in claim 1 further comprising cavity below said light emitting portion.

3. A floor assembly as set forth in claim 2 wherein said light source is disposed in said cavity.

4. A floor assembly as set forth in claim 1 wherein said light source comprises a light emitting diode (LED).

5. A floor assembly as set forth in claim 1 wherein said light source comprises a cold cathode tube.

6. A floor assembly as set forth in claim 1 wherein said light source comprises a strobe light.

7. A floor assembly as set forth in claim 1 wherein said light source comprises a monitor.

8. A floor assembly as set forth in claim 1 further comprising a bottom and at least one side; said bottom and top and said side defining a flooring strip, said top being translucent or transparent.

9. A floor assembly as set forth in claim 8 wherein said flooring strip further includes a tongue-and-groove.

10. A floor assembly as set forth in claim 1 wherein said light emitting portion comprises a light guide assembly.

11. A floor assembly as set forth in claim 10 wherein said light guide assembly comprises a light guide portion and said light refracting portion.

12. A floor assembly as set forth in claim 1 wherein said light refracting portion comprises a corner prism.

13. A floor assembly as set forth in claim 1 wherein said light refracting portion comprises a mirror.

14. A floor assembly as set forth in claim 1 wherein said light refracting portion comprises fiber optics.

15. A floor assembly comprising:
    a floor surface and having at least one light emitting portion for emitting light therethrough, said light emitting portion comprising a light refracting portion for guiding light passing therethrough and a protective top over said light refracting portion, said protective top creating a level surface with said floor surface; and
    at least one light source disposed below said light refracting portion for providing light to the light refracting portion.

16. A floor assembly as set forth in claim 15 wherein said light source comprises a light emitting diode (LED).

17. A floor assembly as set forth in claim 16 further comprising a controller, said light emitting diode coupled with said controller.

18. A floor assembly as set forth in claim 16 further comprising a light guide portion coupled with said light refracting portion for receiving light from said LED and transmitting it to said light refracting portion.

* * * * *